Feb. 13, 1940.  R. S. BASSETT  2,190,006

LIQUID METER

Filed Feb. 24, 1939

INVENTOR

Robert S. Bassett

Patented Feb. 13, 1940

2,190,006

UNITED STATES PATENT OFFICE 2,190,006

LIQUID METER

Robert S. Bassett, Buffalo, N. Y.

Application February 24, 1939, Serial No. 258,220

3 Claims. (Cl. 73—277)

This invention relates to water meters of the gear type especially those with frost protection and has among its objects the support of the inner and more expensive working parts of the meter in the outer surrounding case in such a manner that, as the meter freezes, they, as well as the main outer case, will be relieved from strain and distortion due to the breaking of an inexpensive part, usually the bottom of the outer case.

Another object of my present invention is to improve the construction and arrangement of the parts in a gear type meter so as to increase the accuracy and efficiency of the meter through reducing leakage past the gears at the points of contact between the gears.

I have provided for a plurality of pairs of gears in the measuring chamber instead of the usual single pair of gears so that there is a plurality of sets of contact between the gears to prevent leakage of liquid past the gears without being measured by the meter.

I will now proceed to definitely describe the manner in which I have carried out my invention and then claim what I believe to be novel.

Figure 1:
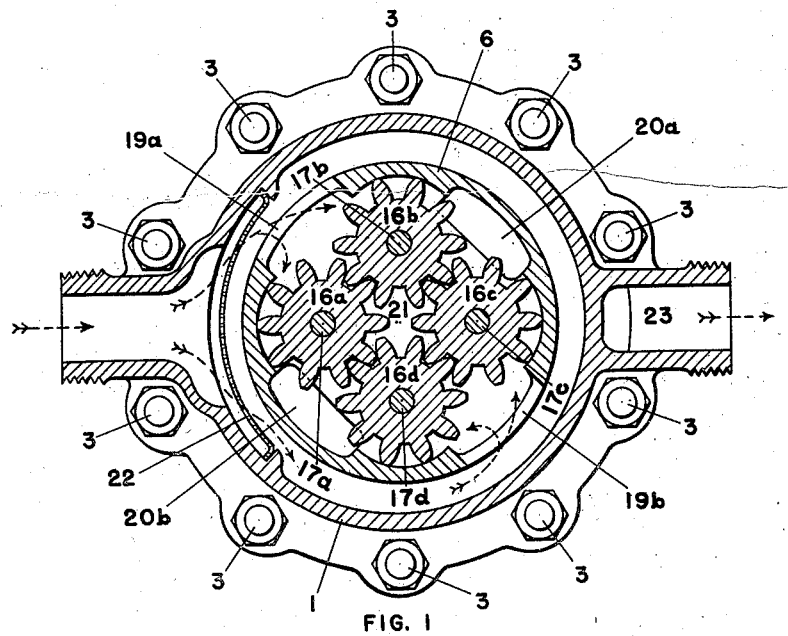
Figure 2:
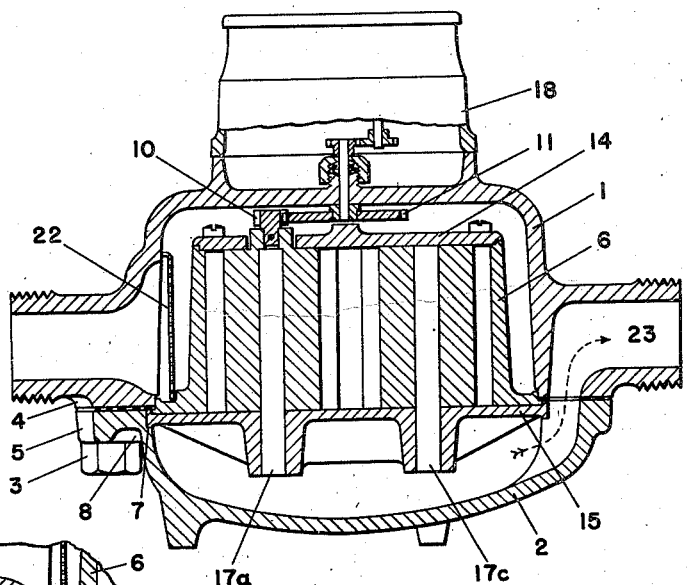
Figure 3:
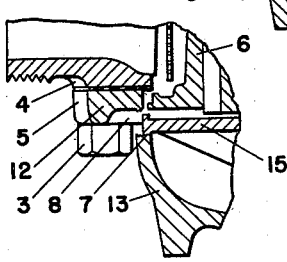

In the accompanying drawing Figure 1 is a horizontal section of my improved meter; Figure 2 is a vertical partial section of the meter showing how the interior parts are supported in place; Figure 3 is a section of the casing meeting flanges and shows how the expansion of frozen water would break the breakable part of the meter casing to allow the displacement downward of the measuring chamber and also the separation of the measuring chamber parts to prevent distortion of such parts by the expansion of frozen water.

Referring to the drawing, 1 is the main outer casing of the meter, 2 is the breakable bottom casing of the meter which is attached to casing 1 by bolts 3, 3, 3, 3, 3, 3, 3, 3, 3, and 3. These bolts pass through meeting flanges 4 and 5, clamping them together. 6 is the body of the measuring chamber which is clamped and centered between casings 1 and 2 in the machined grooved seat 7, so that, when the meter is used to measure water and the water freezes, the metal, which is of a predetermined thickness, between grooved seat 7 and a cast groove 8, will fracture by the strain becoming too great for it to withstand, and the measuring chamber will be released as shown in Figure 3. 10 and 11 are intermediate toothed gears so mounted within casing 1 that they may move apart axially, when casing 1 and measuring chamber body 6 move apart slightly as shown in Figure 3.

Bottom casing 2 consists essentially, after fracture, of two parts. Outer part 12 is the portion that remains attached to main outer casing 1 even after the meter is frozen. 13 is the central movable part which is displaced downward by the expansion of the ice within the meter.

Measuring chamber body 6 is shown as being made open at either end. Measuring chamber top 14 and measuring chamber bottom 15 complete the measuring chamber shell which, however, could also be made with body 6 and top 14 as one integral part since, as shown in Figure 2, they are assembled rigidly together to form a unit. Bottom 15, when used in a water meter that may be frozen, should be clamped as shown to body 6 by the meter casing, though my invention is not limited to this exact method of holding the measuring chamber shell together, except where there is liability of water within the meter becoming frozen.

Within the measuring chamber are a plurality of pairs of metering gears intermeshing in a closed series as shown, and with any suitable tooth form. For installations where the liquid within the meter may freeze, a straight tooth is preferable to a helical tooth to allow the gears to move freely axially upon separation of the measuring chamber shell parts. In the drawing I have shown metering gears 16a, 16b, 16c and 16d, which mesh together. As shown in Figure 1, these gears rotate around gear shafts 17a, 17b, 17c and 17d which may be constructed as shown, rigidly mounted on measuring chamber bottom 15. Separable bottom 15 holds the metering gears in place axially within the measuring chamber. Gear 16a has intermediate pinion 10 rigidly mounted on it to transmit the motion of the metering gears to recording register 18 which may be of any conventional type and which is not shown in detail.

The flow of the liquid to be measured is through strainer 22 into measuring chamber inlet openings 19a and 19b. The liquid so entering pushes on the teeth of the metering gears, causing gears 16a and 16c to revolve in a counter-clockwise direction, as shown in Figure 1, while gears 16b and 16d will revolve in a clockwise direction, all in the usual manner for liquid meters or liquid motors of the gear type. The liquid passes along the inner periphery of parts of the measuring chamber body 6 adjacent to the metering gear teeth, being transferred in such portions within the spaces between the teeth of the rotating gears and the measuring chamber wall. After passing through these spaces the liquid passes out through measuring chamber outlets 20a and 20b, from there to pass out through meter outlet 23 as indicated by the arrows. One of the most novel features of my gear type meter is the packing obtained by liquid trapped within center space 21, which is formed between the pairs of gears and which requires a plurality of pairs to form. By having a plurality of sets of contacts between the teeth of adjacent gears, the resistance to leakage is at least doubled as compared to that which is obtained in a simple gear type meter with only two gears. As it is difficult to obtain a contact between gear teeth which will prevent the flow of liquid between them my invention, by doubling the number of contacts, makes the resistance to leakage at this point fully equal to the resistance against leakage at the points where the tips of the gear teeth come in contact with the inner surface of the measuring chamber body.

I claim as my invention:

1. A liquid meter comprising a main outer casing, a bottom outer casing attached to said main outer casing, a measuring chamber within said casings, a series of alternately disposed inlet and outlet ports at the periphery of said chamber, a plurality of pairs of metering gears within said chamber arranged in a closed series with adjacent gears intermeshing, and a register operatively connected to said gears.

2. A liquid meter comprising a main outer casing, a bottom outer casing attached to said main outer casing, a measuring chamber within said casings, a series of alternately disposed inlet and outlet ports at the periphery of said chamber, a plurality of pairs of metering gears within said chamber arranged in a closed series with adjacent gears intermeshing and enclosing a central liquid pocket, and a register operatively connected to said gears.

3. A liquid meter comprising a main outer casing, a bottom outer casing attached to said main outer casing and having a central readily breakable section, a measuring chamber body within said main outer casing, a separable measuring chamber bottom held against said measuring chamber body by said breakable section, a closed series of four intermeshing metering gears held in place axially within said measuring chamber body by said measuring chamber bottom, and a register operatively connected to said gears.

ROBERT S. BASSETT.